(12) United States Patent
Williams

(10) Patent No.: US 10,364,795 B2
(45) Date of Patent: Jul. 30, 2019

(54) WIND TURBINE FOR USE IN HIGH WINDS

(71) Applicant: Darell Allen Williams, California City, CA (US)

(72) Inventor: Darell Allen Williams, California City, CA (US)

(*) Notice: Subject to any disclaimer, the term of this patent is extended or adjusted under 35 U.S.C. 154(b) by 0 days.

(21) Appl. No.: 15/588,419

(22) Filed: May 5, 2017

(65) Prior Publication Data

US 2017/0248122 A1    Aug. 31, 2017

Related U.S. Application Data

(63) Continuation-in-part of application No. 14/791,274, filed on Jul. 3, 2015, now Pat. No. 9,777,707.

(51) Int. Cl.
| | |
|---|---|
| *F03D 7/02* | (2006.01) |
| *F03D 1/06* | (2006.01) |
| *F03D 80/80* | (2016.01) |
| *F03D 9/25* | (2016.01) |
| *F03D 9/45* | (2016.01) |
| *F03D 9/00* | (2016.01) |
| *F03D 1/04* | (2006.01) |

(Continued)

(52) U.S. Cl.
CPC .............. *F03D 7/0204* (2013.01); *F03D 1/04* (2013.01); *F03D 1/0666* (2013.01); *F03D 1/0675* (2013.01); *F03D 7/022* (2013.01); *F03D 7/028* (2013.01); *F03D 9/008* (2013.01); *F03D 9/28* (2016.05); *F03D 15/00* (2016.05); *F05B 2240/31* (2013.01); *F05B 2240/313* (2013.01); *Y02B 10/30* (2013.01); *Y02E 10/721* (2013.01); *Y02E 10/723* (2013.01); *Y02E 10/725* (2013.01)

(58) Field of Classification Search
CPC . F03D 1/04; F03D 1/0675; F03D 9/35; F03D 1/0683; F03D 3/0409; F03D 7/0204; F03D 7/0224; F03D 9/25; F03D 9/255; F03D 7/022; F03D 7/028; F03D 1/0666; F05B 2240/31; F05B 2240/313
See application file for complete search history.

(56) References Cited

U.S. PATENT DOCUMENTS 3,952,723 A * 4/1976 Browning ................. F03D 9/22
                                                                122/26
4,110,631 A * 8/1978 Salter ........................ F03D 1/02
                                                                290/55

(Continued)

*Primary Examiner* — Justin D Seabe
*Assistant Examiner* — Julian B Getachew
(74) *Attorney, Agent, or Firm* — KSIP

(57) ABSTRACT

A wind energy generation turbine is built to take advantage of high winds in mountain passes and other areas of extreme wind velocity. A windmill section is raised high by support structures. Electricity generators are kept in the base of the windmill to reduce elevated weight. A nozzle or shroud channels wind into a narrow raceway to take advantage of the Venturi effect. Windmill blade tips housed within a circular raceway are strengthened by blade tip connectors and blade spar struts against high wind forces. Windmill blade angle and windmill wind facing are dynamically altered by computerized motors for maximum efficiency. Windmill blade angle and/or generator load maintain ratio of windmill blade tip speed to wind speed for efficiency. Turbine speed translation gears are able to decouple windmill from 60 Hz cycle or use water pumps and gravity to store energy at peak generation times.

14 Claims, 12 Drawing Sheets

(51) Int. Cl.
*F03D 15/00* (2016.01)
*F03D 9/28* (2016.01)

(56) References Cited

U.S. PATENT DOCUMENTS

| | | | | |
|---|---|---|---|---|
| 4,183,715 A * | 1/1980 | Ducker | F03D 7/0224 | 416/104 |
| 4,364,708 A * | 12/1982 | David | F03D 1/0658 | 416/132 B |
| 4,421,452 A * | 12/1983 | Rougemont | F03D 1/04 | 415/122.1 |
| 4,729,716 A * | 3/1988 | Schmidt | F03D 7/0204 | 416/10 |
| 5,083,039 A * | 1/1992 | Richardson | F03D 7/0272 | 290/44 |
| 5,202,672 A | 4/1993 | Nakamura et al. | | |
| 6,902,370 B2 * | 6/2005 | Dawson | F03D 7/0236 | 415/4.1 |
| 7,821,164 B2 | 10/2010 | Laskaris et al. | | |
| 7,939,958 B2 | 5/2011 | Todoroff | | |
| 8,148,841 B1 | 4/2012 | Apthorp | | |
| 8,257,019 B2 | 9/2012 | Cironi | | |
| 8,269,369 B2 | 9/2012 | Todoroff | | |
| 8,282,353 B2 | 10/2012 | Russ et al. | | |
| 8,338,979 B2 | 12/2012 | Bray | | |
| 8,382,440 B2 * | 2/2013 | Baker | F03D 1/0675 | 416/226 |
| 8,403,786 B2 | 3/2013 | Bech | | |
| 8,459,872 B2 | 6/2013 | Nies et al. | | |
| 8,502,403 B2 | 8/2013 | Merswolke et al. | | |
| 8,585,367 B2 | 11/2013 | Bech | | |
| 2002/0095878 A1 * | 7/2002 | Henderson | E04H 12/182 | 52/116 |
| 2012/0292912 A1 | 11/2012 | Haskell | | |
| 2013/0195655 A1 * | 8/2013 | Kerner | F03D 7/0236 | 416/1 |
| 2013/0216381 A1 | 8/2013 | Liu | | |

* cited by examiner

WIND TURBINE FOR USE IN HIGH WINDS

CLAIM OF PRIORITY BENEFIT

This application claims the benefit of prior USPTO Utility application Ser. No. 14/791,274, filed 3 Jul. 2015 and is a Continuation-In-Part of said prior application.

FIELD OF THE INVENTION

The invention relates to wind turbines. Specifically, it relates a power-generating wind turbine especially suited for use in high winds.

REFERENCES CITED

| DOCUMENT | DATE FILED | AUTHOR(S) |
| --- | --- | --- |
| 5,202,672 | May 1992 | Nakamura, et. al. |
| 7,821,164 | February 2007 | Laskaris et. al. |
| 7,939,958 B2 | May 2008 | Todorof |
| 8,148,841 | November 2008 | Apthorp |
| 8,257,019 B2 | October 2010 | Cironi |
| 8,269,369 B2 | March 2011 | Todoroff |
| 8,282,353 | June 2006 | Russ et. al. |
| 8,338,979 | June 2011 | Bray |
| 8,403,786 | July 2009 | Bech |
| 8,459,872 B2 | October 2008 | Nies, et. al. |
| 8,502,403 B2 | January 2008 | Merswolke, et. al. |
| 8,585,367 | July 2009 | Bech |
| US2012/0292912 | March 2008 | Haskell |
| US2013/0216381 | June 2011 | Liu |

DESCRIPTION OF RELATED ART

The following references represent advances in the art, but none of these references incorporate all the features of the present invention, as explained below. The features of the present invention are organized in a way that generates a superior amount of electrical energy from the same amount of wind energy.

This also distinguishes the present invention from all inventions of the prior art. Many inventions of the prior art were also created for completely different purposes from the present invention, and therefore would have no reason to incorporate the features of the present invention.

Bech describes a wind-powered turbine with an improved drive train in U.S. Pat. No. 8,403,786. This turbine includes improvements over turbines of the previous design, but Bech's turbine does not include many of the improved features of the present invention, such as the ability to support the turbine from above, and the ability to move the windmill connected to the turbine to catch the greatest amount of wind, and the "shroud" which increases the amount of wind energy which is funneled through the windmill so that it eventually reaches the turbine.

Bech describes another wind-powered turbine with an improved drive train in U.S. Pat. No. 8,585,367. The main bearing unit of this turbine has multiple rings. However, this invention does not include the ability to support the turbine from above, and the ability to move the windmill connected to the turbine to catch the greatest amount of wind, and the "shroud" which increases the amount of wind energy which is funneled through windmill and eventually reaches the turbine.

Laskaris, et. al. describe, in U.S. Pat. No. 7,821,164, a generator with superconducting components, which can be attached to a wind-powered turbine. They claim the generator, and certain associated methods, as their invention, and also claim that the generator they have described is more successful at generating power from wind-driven turbines than previous models. However, the electricity-generating windmill which they describe is conventional and lacks many of the improved features of the present invention, such as the ability to support the windmill and turbine from above, and the ability to move and configure the blades of the rotors to catch the greatest amount of wind, and the "shroud" which increases the amount of wind energy which is funneled through windmill and ultimately reaches the turbine. The present invention is therefore based on different principles from Laskaris' invention, and represents different types of improvement over previous windmills that generate electricity.

In U.S. Pat. No. 8,338,979, Bray et. al. describe another generator with superconducting components, which can be attached to a wind-powered turbine. This has certain improvements over the Laskaris patent, and they also claim the generator, and certain associated methods, as their invention. Bray describes an electricity-generating windmill which lacks many of the improved features of the present invention, such as the ability to support the turbine from above, and the ability to move the blades to catch the greatest amount of wind, and the "shroud" which increases the amount of wind energy which is funneled through the turbine.

Todoroff describes, in U.S. Pat. No. 7,939,958, an electricity-generating windmill which includes the ability to change the angle of the rotor blades to catch the maximum amount of wind energy. However, the invention of Todoroff does not include the ability for the turbine to be supported from above, and the angle of the blades of Todoroff's turbine is changed through a different method from the way that the rotor is moved in the present invention. The present invention includes cables, attached to each of the blades of the rotor. The blades are also divided into sections. The present invention has the ability to position each section of each blade to catch the optimal amount of wind energy. Todoroff's invention does not include this capability.

Todoroff also does not include the shroud, which maximizes the amount of wind energy flowing through the rotor. The wind turbine of the present invention is also adjustable for height, which is a feature lacking in Todoroff.

In U.S. Pat. No. 8,269,369 B2, Todoroff describes an electricity-generating windmill with a gearless assembly. This invention, too, does not include the ability for the windmill to be supported from above, and the angle of the blades of the rotor of Todoroff's windmill is changed through a different method from the way that the blades of the rotor are angled in the present invention. Todoroff also does not include the shroud, which maximizes the amount of wind energy flowing through the rotor. The wind turbine of the present invention is also adjustable for height, which is a feature lacking in Todoroff.

Russ et. al. describe a bearing unit for rotor blades, which can be used to absorb the force that wind pressure may exert upon the rotor and blades of a windmill. However, Russ' invention speaks to a bearing unit, not to a windmill that generates electricity, and therefore lacks many of the improved features of the present invention, such as the ability to support the rotor from above, and the ability to move the sections of the blades to catch the greatest amount of wind, and the "shroud" which increases the amount of wind energy which is funneled through the turbine.

Apthorp discloses, in U.S. Pat. No. 8,148,841, a modular windmill system with stacked groups of blades. The stacked configuration of the blades in Apthorp's invention is very different from the configuration of the blades in the present invention, and operates on different principles. Apthorp's invention does not include many of the features of the present invention, such as the ability to support the turbine from above, and the ability to move the blades to catch the greatest amount of wind, and the "shroud" which increases the amount of wind energy which is funneled through the turbine. In fact, Apthorp teaches away from these innovations. Apthorp also does not include the connection of the windmill to a reservoir of water, which is part of the present invention.

Cironi describes, in U.S. Pat. No. 8,257,019 B2, an electricity-generating windmill with a shroud. The shroud is adapted to direct wind energy to the rotor. However, the support structures for the windmills described in Cironi are made of concrete, which is very different from the support structures of the present invention (See FIG. 10B of Cironi). The support structures in Cironi support the wind turbines from below, like the support structures for all electricity generating windmills of the prior art. The support structures of the present invention support the invention from above, or consist of cables that support the angle of attack, or struts in certain embodiments. Cironi also does not describe the ability to connect the turbine to a reservoir of water or other secondary power reserve.

In U.S. Pat. No. 8,459,872, Nies, et. al. describe a bearing for use with windmills that generate electricity. This is different from the present invention, which is focused on the windmills themselves, and structural elements supporting them. Furthermore, Nies teaches away from the present invention, which can be seen because Nies shows a conventional electricity-generating windmill in FIG. 1 of Nies.

Merswolke, et. al., describe in U.S. Pat. No. 8,502,403 a windmill which generates electricity, which is connected to multiple generators. However, the windmill itself is conventional, and does not possess several important features of the present invention. These features include the present invention's ability to support the rotor from above, and the ability to move the sections of the windmill blades to catch the greatest amount of wind energy, and the "shroud" which increases the amount of wind energy which is funneled through the rotor. Merswolke also does not include the ability to connect the windmill to a reservoir of water or other secondary power reserve.

Haskell describes, in patent application US2012/0292912 A1, a small wind-powered generator that can be placed near roadways and can generate electricity, based on wind created by the automobiles, or natural wind. This energy can then be stored. However, Haskell's invention does not include a means of storing the electrical power. Furthermore, Haskell's invention does not possess many features of the present invention, including the ability to support the rotor from above, and the ability to move the sections of the blades to catch the greatest amount of wind energy, and the "shroud" which increases the amount of wind energy which is funneled through the rotor. The present invention also includes different components, and operates upon different principles, from Todoroff's invention.

Application US2013/0216381 A1, by Liu, describes a turbine designed to be powered by fluid oscillation. This is very different from the claimed invention, because it involves generating electricity from the kinetic energy of fluid, not air. Fluid has several characteristics that air does not have, such as cavitation. Air also has several characteristics that fluid does not have. For example, Boyle's law applies to air but does not apply to fluid. Furthermore, the design of the turbine in Liu works on fluid oscillation, which is a different physical phenomenon from the wind energy which powers the present invention. Liu's patent application also does not discuss the possibility of supporting the rotor from above, and the ability to move the sections of the blades to catch the greatest amount of wind, and the "shroud" which increases the amount of wind energy which is funneled through the rotor. These are all part of the present invention.

Apthorp, at col. 2, lines 30-45, says "It has long been thought that substantial performance advantages could be realized by the use of a shroud and diffuser on a wind turbine", but that "Many groups have become interested in diffuser-augmented windmills, but they have always dropped the idea because the diffuser had to be so much larger than the windmill rotor that the system has heretofore been considered economically impractical." Therefore, Apthorp taught away from the idea of the shroud which is part of the present invention.

Apthorp, Col. 2, line 65-Col. 3, line 30, notes that windmills of the prior art are highly vulnerable to stress from the windmill or other supporting structure during high wind speeds. Apthorp also indicates that prior art windmills had (at that time) been primarily built by placing the rotors on top of very tall towers, that this made the windmills vulnerable to bending in high winds, and that this problem could not be alleviated by guidewires or struts because the rotating windmill blades would get in the way. The present invention solves all these problems. None of these inventions discussed here include the ability of a windmill to be supported from above, which allows the windmill to be scalable and to be much larger than windmills that are only supported by a post. None of the inventions also include the additional feature of connecting the wind-powered turbine to a water reservoir, to create a "reserve" which can be used to generate hydroelectric power when there is insufficient wind energy available to supply the needs of the grid.

BACKGROUND

Windmills which generate electricity by harnessing wind power have existed for several decades. Existing designs generate electrical power, but the cost of this power has generally been uncompetitive with electricity generated by burning fossil fuels. Electricity generated through wind power usually costs more than twelve cents per kilowatt-hour, on a wholesale basis. Electricity generated by burning fossil fuels, by contrast, costs around 8 cents per hour. Inventors have therefore tried to create electricity-generating windmills that can generate a larger amount of electrical energy from the same amount of wind energy. Other inventors have attempted to create electricity-generating windmills with parts in configurations that are different from electricity-generating windmills of the standard design.

Much of the electrical power generated in the world today is generated through power plants which burn fossil fuels, namely oil, coal, and natural gas. The Earth's supply of fossil fuels is finite, and, in addition, combustion of fossil fuels has other drawbacks, such as emissions of carbon dioxide and particulate matter. These problems have become more urgent in recent years, because of the increase in oil prices, and because of mounting global concern about greenhouse gas emissions.

Utilities and individuals have launched an effort to create other, less polluting ways of generating electricity. "Renewable" sources of electrical power include wind power, solar power, and other sources. Wind power is generally harnessed through windmills that generate electricity. When the wind blows, it causes the rotor blades of the windmill to turn, which drives a turbine, which is connected with one or more generators, which generate electricity.

General Principles Governing the Amount of Electricity Generated by a Windmill

There is a strong positive correlation between the amount of wind energy captured by the windmill and the amount of electrical power which can be generated by the generators connected with the windmill, for any given electricity-generating windmill. Therefore, the more wind energy is captured by the windmill, the more electricity the generators connected with the windmill will be able to generate, until the generators reach their maximum capacity. The general rule is that a portion of the energy contained within the wind is captured when it hits the blades, which are less than 100% efficient. A portion of the energy captured by the blades then goes to the turbine, which is also less than 100% efficient. Finally a portion of the energy which reaches the turbine then is transmitted to the generators, which are also less than 100% efficient. The generators then generate electricity.

The speed at which the wind is blowing is proportional to the energy within the wind, and therefore, more electrical energy can theoretically be generated from wind traveling at faster speeds.

The equation governing the kinetic energy of the wind hitting a wind-powered turbine's blades is $$ke = \tfrac{1}{2}mv^2$$

where ke=kinetic energy, m=mass and v=velocity.

Thus, absent other considerations, a twofold increase in the wind speed of wind hitting the blades of a rotor of a windmill will result in a fourfold increase in the amount of wind energy imparted to the blades of that windmill.

The power output of an electricity-generating windmill is also directly related to the windmill's total blade area. A twofold increase in the total surface area of the blades will result in a twofold increase in the amount of wind hitting the blades, and therefore, will result in a twofold increase of the amount of wind energy imparted to the blades of that windmill, if all other factors are equal.

Other factors may vary, which will cause some variation in the increased amount of power that a windmill actually generates in the above scenarios. For example, each blade sometimes creates a small amount of turbulence in the air, which may affect the amount of electricity generated by the other blades of the windmill. However, the above rules are useful guidelines for calculating the amount of electrical energy that a given windmill has the ability to produce;

Therefore, as a general rule, a windmill will generate more energy if it utilizes higher-speed winds, and will also generate more energy if it has wider blades. The capacity of the turbines and generator connected to the windmill are also relevant factors. Larger numbers of generators, and higher-capacity generators, will be able to convert a greater amount of kinetic energy to electrical energy.

Another limitation of electricity-generating windmills of the prior art is that the generator(s) are placed at or near the conventional center (5) of a prior art electricity-generating windmill. This limits the size of the generator(s) which can be included as part of a prior art electricity-generating windmill, because more and/or larger generators are heavier. Therefore, when placed at or near the conventional center (5), they will make the conventional windmill (4) less stable, and will increase the risk of the conventional windmill (4) collapsing or falling over in high winds. The ability of conventional windmills (4) to create electrical energy is therefore limited by the lack of generators to utilize the energy carried by the wind power hitting the conventional windmills' (4) blades. The present invention solves this problem by allowing the generators to be placed at ground level, or below ground. Therefore, the number, size, capacity of such generators can be increased indefinitely, as needed. The stability of the machine of the present invention will not be affected by this.

The Venturi Effect and its Relevance to Wind Power

The Venturi Effect has been known since 1797. The Venturi Effect is that, as a fluid passes through a constricted tube, the fluid's velocity must increase, and its pressure must decrease. The equation governing this is as follows:

$$p_1 - p_2 = d/2((v_2)^2 - (v_1)^2)$$

Where $p_1$ is the fluid pressure at the wider opening, $p_2$ is the fluid pressure at the narrower opening, d is the density of the fluid, $v_2$ is the fluid velocity when the pipe is narrower, and $v_1$ is the fluid velocity when the pipe is wider.

The Venturi effect can be used to increase the speed of a boat or other watercraft, which is connected to a constricted tube, because of the increase in velocity and decrease in pressure of the water as it passes through the tube. Some hydrofoil boats use the Venturi effect to increase their speed.

An effect similar to the Venturi effect applies to air and other gases, in that as a gas passes through a constricted tube, where the tube is narrower at some points than others, the gas's velocity must increase, and its pressure must decrease, at the narrower points.

This has important implications for the ability of windmills to generate electricity. If the wind passing through a windmill's blades has a higher velocity, then the kinetic energy hitting the windmill's blades will be higher, as noted above. The windmill will therefore be able to generate more electricity, as explained above. Some embodiments of the present invention employ a "shroud" with openings that are wider than the diameter of the blade rotors. This shroud constricts the air as it passes through the windmill's rotors, and increases the velocity of that air. This then increases the energy of the wind passing through the rotors, enabling the windmill to ultimately generate more electricity.

Other embodiments of the present invention shape the shroud like a nozzle, which also constricts the air as it passes through the windmill's rotors, increasing the kinetic energy of that air, which then hits the blades, enabling the windmill to ultimately generate more electricity.

Still other embodiments of the present invention use a lightweight, thin, metal nozzle to constrict the air as it passes through the rotors.

Generating Capacity

The capacity of the generators associated with an electricity-generating windmill is a potentially limiting factor in the windmill's ability to generate electricity. Therefore, a windmill which is attached to more or larger generators will have a greater capacity to produce electricity. The amount of electricity produced by the windmill will, of course, be a function of the amount of energy which reaches the generators, which is partially governed by the factors discussed above. The electricity-generating machine of the present invention is designed with the generators near ground level. This is important, because the machine of the present invention can accommodate more and larger generators than windmills of the prior art.

DETAILED DESCRIPTION

Figure 1:
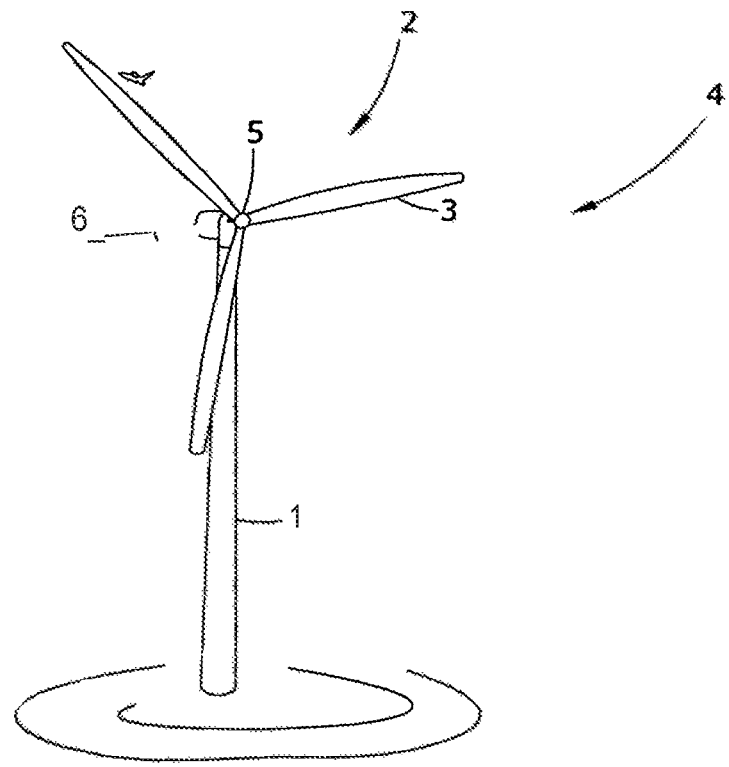
FIG. 1 is a perspective view of a conventional power-generation windmill in the prior art

FIG. 1 is a perspective view of a conventional power-generation windmill in the prior art. Prior art electricity-generating windmills are only able to capture a small portion of the wind energy passing through them. Some of the reasons for this are explained below.

The blades of electricity-generating windmills turn in a circle, so it will be useful to think of the area within a complete rotation covered by the blades of a windmill, as they turn, as 360 degrees. The area of a blade can be seen in terms of the number of "degrees" within a 360-degree turn that the blade covers. For example, a blade which covers 4 degrees would cover 4/90 of the total area embraced by the blades as they turn. A blade which covers 1 degree would cover 1/360 of the total area embraced by the blades as they turn.

Electricity-generating windmills of the prior art generally include three blades, which each cover 2.5 to 3 degrees. Therefore, the total area embraced by the blades amounts to the equivalent of 7.5 to 9 degrees, or, at most 1/40 of the complete area of the circle covered by the blades as they turn.

The narrower blades, especially at their outer edges, capture less of the wind energy passing through the windmill than wider blades would capture. This is because wider blades would be hit by a larger portion of the wind passing through the windmill. In other words, a conventional windmill (4) of the prior art, with three blades covering three degrees each, would cover nine degrees of the area embraced by the blades as they rotate. It would be able to capture 9/360, or 1/40 of the kinetic energy of the wind passing through this area. An explanation of this is illustrated by FIG. 1. The conventional post (1) holds up the conventional windmill (4) comprising the conventional rotor (3). The rotor, in turn, includes the conventional blades (2) and the conventional center (5). As wind blows, the wind hits the conventional blades (2). The wind energy hitting the conventional blades (2) causes the conventional blades (2) to turn. This, in turn, powers a turbine, which powers a conventional generator (6). There are only three conventional blades (2), and they each embrace, at most, 3 degrees. The design of windmills of the prior art requires that the conventional generator (6) be placed on top of the conventional pole (1). This typical conventional generator (6) usually weighs more than 400,000 pounds. This limits the potential weight of the conventional blades (2) and increases the potential instability of windmills of the present design in winds above 29 mph.

A larger weight on top of the conventional pole (1) makes the conventional pole (1) less stable. Conventional generators (6) are a large weight. More, or larger, generators are required to generate larger amounts of electricity, as discussed above. Therefore, the capacity of a windmill to produce electricity will eventually be limited by the total capacity of the generators that it is attached to. Electricity generating windmills of the prior art have the conventional generator (6) on top of the pole (1). Electricity-generating windmills of the prior art are limited in the size and number of the conventional generators (6) that they are attached to, because the large weight of the conventional generator (6) on top of the conventional pole makes the conventional pole (1) less stable, and create a large risk of components flying off the conventional poles (1) in winds above 29 mph.

The current invention solves this difficulty by placing the generators near ground level. The current invention can therefore include much larger and more numerous generators than electricity-generating windmills of the prior art. This increases the current invention's ability to generate electricity.

Electricity-generating windmills of the prior art generally use three narrow blades because their design, with both the conventional rotor (3) and the conventional generator (6) on top of the conventional post (1), does not allow for a larger number of conventional blades (2). Most of the problems discussed below would also be present in an electricity generating windmill of the current prior art, which had more than three conventional blades (2) on the conventional rotor (3). In other words, the presence of more conventional blades (2) would have no effect on these problems in an electricity-generating windmill of the prior art.

Figure 2:
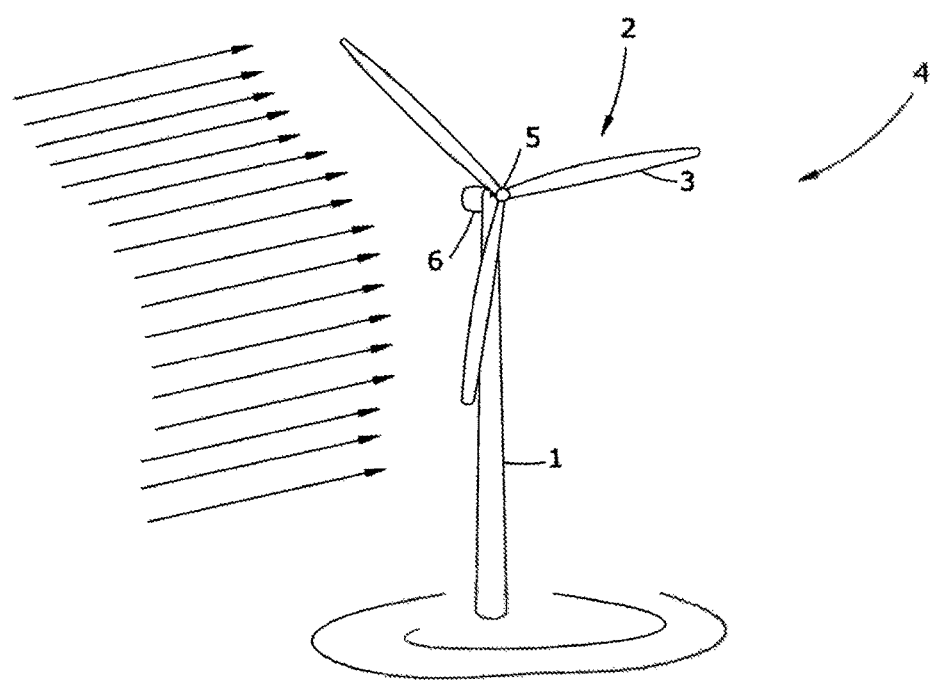
FIG. 2 is a perspective view of a conventional power-generation windmill in the prior art with parallel arrows indicating direction of wind.

FIG. 2 is a perspective view of a conventional power-generation windmill in the prior art with parallel arrows indicating direction of wind. The currently prevalent electricity-generating windmill design, which lacks several features of the present invention, cannot operate safely in winds above 50 mph. Electricity-generating windmills of the currently prevalent design will turn their blades parallel to the wind in speeds above 50 mph. Winds above 29 mph create a risk that the conventional blades (2) will fly off the conventional rotor (3), which is a safety hazard. The conventional blades (2) will usually weigh more than 33,000 pounds each, and are big enough that one of them could easily kill a bystander whom it hits. The electricity-generating windmills of the prior art therefore becomes unstable at wind speeds above 29 mph, and must therefore be shut off at wind speeds above 50 mph. All wind energy which might pass through the conventional rotor (3) is wasted at wind speeds above 50 mph. This is doubly unfortunate, because the amount of wind energy passing through a rotor increases in geometric proportion to the speed of the wind, as noted above.

Therefore, electricity-generating windmills of the prior art are unable to generate electricity at the precise time when the greatest amount of wind energy is available. Todoroff noted this problem, and stated that "It is well-known that in the art of wind turbines that the blade assembly can experience catastrophic force from excessive or high-velocity winds" in U.S. Pat. No. 8,269,369 82.

Current electricity-generating windmills also do not take maximum advantage of the amount of wind energy passing through them because their conventional rotors (3) and conventional blades (2) are generally fixed to only face in one direction. Thus, if the direction that the wind is blowing varies, a conventional electricity-powered windmill cannot move to "catch" the wind and utilize the maximum amount of wind energy. If the wind is blowing at an angle perpendicular to the direction that the conventional rotors (2) and conventional blades (3) are facing, then an electricity-generating windmill of the current design may be unable to catch and use most of the kinetic energy carried by the wind.

This situation is illustrated by FIG. 2, where the direction of wind is indicated, blowing in a perpendicular manner to the conventional blades (2) of a windmill of the prior art.

These drawbacks exacerbate problems with the reliability of the amount of power generated by current electricity-generating windmills. Current electricity-generating windmills can only generate electrical power when wind is blowing through the rotor at the correct angle, and within a certain range of wind speeds. Therefore, when the wind is blowing at a different angle and/or not blowing within a specific range of speeds, electricity-generating windmills are generating Jess power, which decreases the amount of electricity available to the power grid. This missing electricity must be "made up" from other electrical generation sources, which increases the cost of electricity generated through wind power.

Electricity-generating windmills of the prior art also create a migratory hazard for birds. The tips of the rotor blades of the prior art windmills move at speeds of up to 180 mph. Because the prior art rotors are located far off the ground, the rotor blades are a hazard for birds. This is also shown by FIG. 1, where a bird is indicated. Many areas have passed regulations prohibiting electricity-generating windmills from being deployed in areas where they might become hazardous to large numbers of birds. This limits the number of electricity-generating windmills of the current design that can potentially be built.

This problem is magnified by the fact that electricity-generating windmills of the prior art have generally been built in large groups, located in areas with lower human populations. Conventionally designed electricity-generating windmills each require land in which the conventional pole (1) is planted. The windmill is generally built in a specific location, and is immovable. Unlike the present invention, conventional electricity-generating windmills are usually not designed to be placed on top of, or within, buildings.

Components and Term Numbering

The following terms will refer to different components throughout this patent application, some of which have illustrated term numbers. A section is included for term numbers here, for ease of reference. (1) Conventional pole. (2) Conventional rotor. (3) Conventional blade. (4) Conventional windmill. (5) Conventional center. (6) Conventional generator. (10) Turbine blade area. (11) Pedestal. (14) Raceway. (15) Partitioned blade. (16) Windmill. (17) Blade sub-section. (18) Rib. (19) Blade spar. (20) Semi-flexible foam. (21) Flexible epoxy coating. (22) Coordination cables. (23) Blade coordination motors. (25) Primary generator. (26) Pedestal base. (27) Rotating power transfer sleeve. (39) Rotor. (40) Rotating brackets. (41) Tower brackets. Straight upper support beams. Top support. (44) Lower raceway holding post. (45) Upper raceway holding post. (50) Raceway support cables. (51) Raceway support strut. (52) Turbine shaft front end. (53) Main turbine shaft. (54) Turbine shaft crown. (55) Rotor assembly sleeve. (57) Counterweight. (58) Blade tips. (59) Blade connection cable. (61) Turbine shaft back end. Stilt. External support array. Pillar. Cornerstone knob. (67) Shroud. (68) Shroud unfurling strut. Pump. Reservoir. Hydroelectric device. (72) Lower pedestal support pole. (76) Intersection node. (80) Direction control motor. (81) Bearing. (85) Rigid nozzle. (86) Blade spar struts. Buttress knob. (92) Blade coordination power generator. Footing. (100) Nozzle-shaped shroud. (105) Nozzle-shaped shroud strut. (110) Lower bearing. (112) Upper scaffolding. (114) Support tower. (115) Control gear. Direction control motor (121) 90 degree gear.

Figure 3:
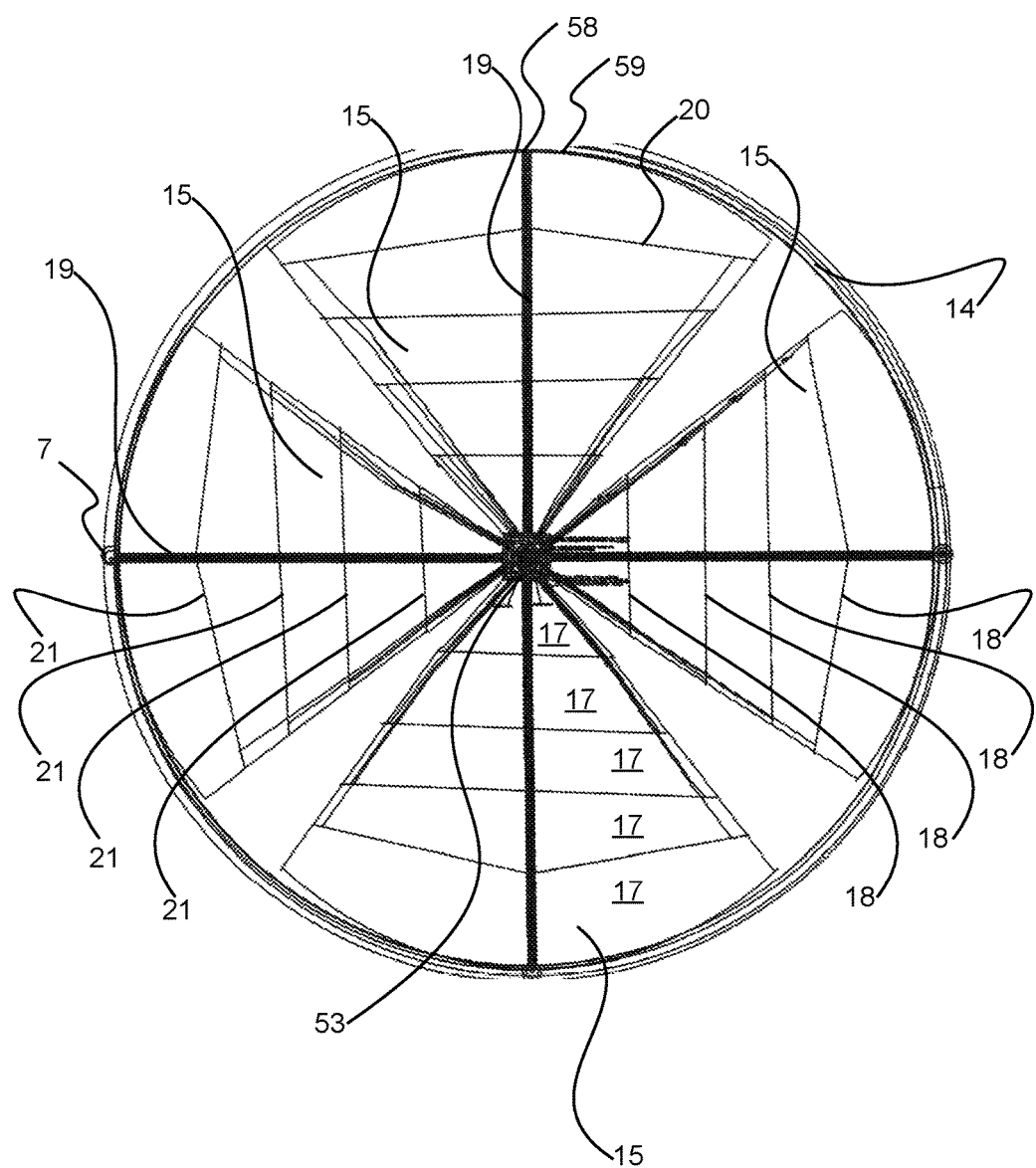
FIG. 3 is a facial view of the partitioned blades as used in the invention.

FIG. 3 is a facial view of the partitioned blades as used in the invention. Each of the partitioned blades (15) of the windmill of the present invention includes at least four blade sub-sections (17). Each partitioned blade (15) will have a blade spar (19) which runs through the center of the partitioned blade (15) and along its length. Multiple ribs (18) which rotate around the blade spar (19) will project from the blade spar (19). Each blade sub-section (17) of each partitioned blade (15) is connected to at least one rib (18), and by the rib (18) to the blade spar (19). The ribs (18) each extend from the blade spar (19) to the edge of the partitioned blade (15).

Blade sections are connected to each other by flexible hinges of, for example, flexible epoxy coating (21) at the ribs (18), so as to make it easier for the blade sub-sections (17) to move relative to each other, and relative to the ribs (18), allowing for different wind attack angles along the length of the blade spar. This semi-flexible foam (20) covered by a flexible epoxy coating (21) may also be on the blade spar (18) to make it easier for the ribs (18) to rotate around the blade spar. A nylon bearing may be mounted between the blade spar (18) and the individual blade sub sections (17) for rotational purposes.

A raceway (14) circles the blade cylinder area and is connected to a wide wind shroud by struts. Struts also connect the raceway to the front and rear tips of a horizontal turbine shaft. The portion of the turbine shaft forward or windward of the raceway is the turbine shaft forward portion. The portion of the turbine shaft rearward or leeward of the raceway is the turbine shaft rearward portion.

The blade shaft or blade spar runs from an inner turbine shaft sleeve (53) area to a roller (7) in a raceway (14). The inner portion of the turbine blade touching the main turbine can be referred to as the turbine blade root. The roller is connected to a cable which runs through the raceway, connecting the outer ends of the blade spars together for stability. The blade spars are supported by struts which extend from the blade spars to the turbine shaft sleeve.

In the preferred embodiment, the inside surface of the raceway ring has a circumferential groove or slot, into which fit the blade tips and rollers. This allows the turbine blades to cover the entire radius of the turbine blade area without leaving space between the blade tips and raceway inside surface.

Cables connect the blade sections to a cylinder at the outer end of a turbine shaft sleeve. These cylinders are connected through right angle gears so the panels on all four blade shafts have the same angle of attack. The cables on one side of the blade sections go to the bottom side of the cylinders. The cables on the other sides of the blade sections go to the opposite ends of the cylinders. This mechanism synchronizes rotating the blade sections around the blade spars.

A "blade connection cable" (59) or other blade tip connecting body connects all of the blade tips (58), providing additional structural support to the invention and helping the invention to function in high winds. The blade connection body is typically a twisted cable of steel or other metal, but can also be a solid ring, a flexible ring, a plurality of solid struts, a plurality of flexible ties, a ring of cable or chain, or a plurality of sections of cable or chain.

This allows the present invention to be placed in many areas individually where conventional windmills cannot be placed. For example, the machine of the present invention could, eliminating the vertical structures and placing the generator in direct connection with the turbine shaft, be placed inside of an opening in a building. This is impossible for windmills of the prior art.

Figure 4:
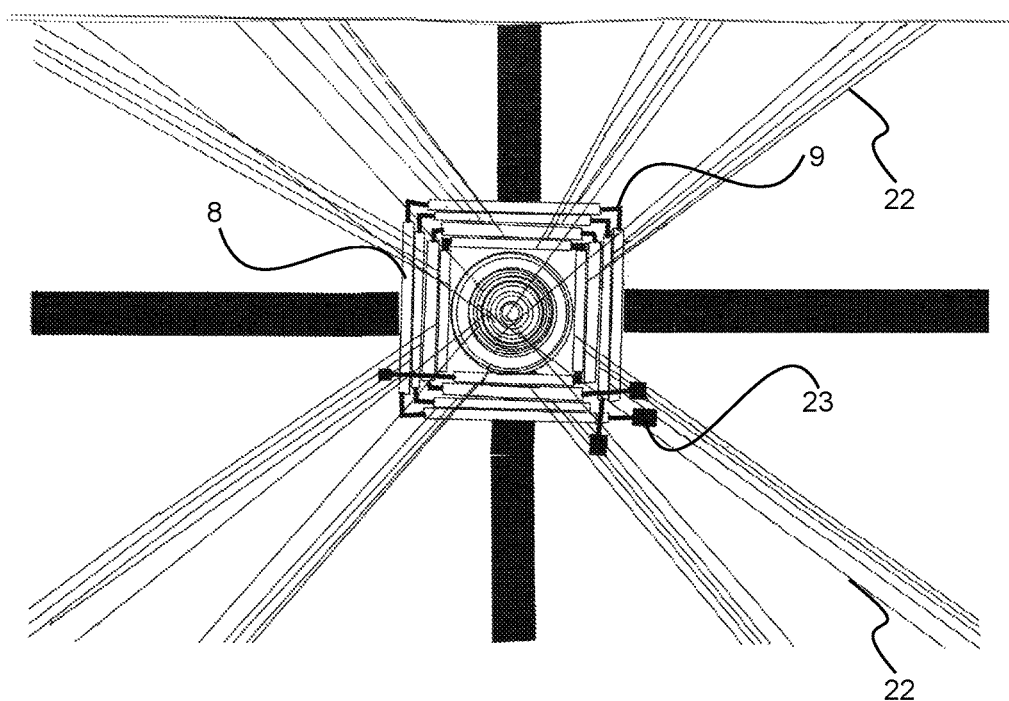
FIG. 4 is a close up of the blade coordination motors and cables running from the center at the turbine shaft.

FIG. 4 is a close up of the blade coordination motors and cables running from the center at the turbine shaft. Four blade coordination cable cylinders (8), one for each blade, are connected in a square by right angle gears (9), for synchronized rotation by a blade coordination motor (23).

Each blade coordination motor has a cable shortening function that retracts cable, wrapping it around a cable cylinder, thus pulling a blade section forward against the wind and changing the blade section's angle to the wind. Each blade coordination motor also has a cable lengthening function that unwinds cable, unwrapping it from a cable cylinder, thus allowing a blade section to be pushed backward by the wind and changing the blade section's angle to the wind. Synchronized rotation pulls a pair of blade coordination cables (22) in or out from each blade coordination cable cylinder, together adjusting the angle of attack on the same panel or blade section of each windmill blade simultaneously. This can be done as wind speed changes.

Each blade section has its own set of blade coordination cable cylinders, motors, cylinders, right angle gears and blade coordination cables, allowing the blade sections to have different wind angles than their neighbors. Note that, for clarity, one instance is labelled of a blade coordination cylinder (8), though there are four for each blade section. One instance is labelled for a right-angle gear (9), though there are four for each blade section. One instance is labelled for a blade coordination motor (23), though there are four for each blade section. One pair is labelled for blade coordination cables (22), though there are four pair for each blade section.

The blade coordination cables (22) run both from either outer end of each blade section (17) to the groups of coordinating motors, cylinders and gears. The blade coordination motors (23) are located within a turbine shaft back end. The coordination cables (22) thus stretch inward from the turbine shaft back end to the partitioned blades.

Figure 5:
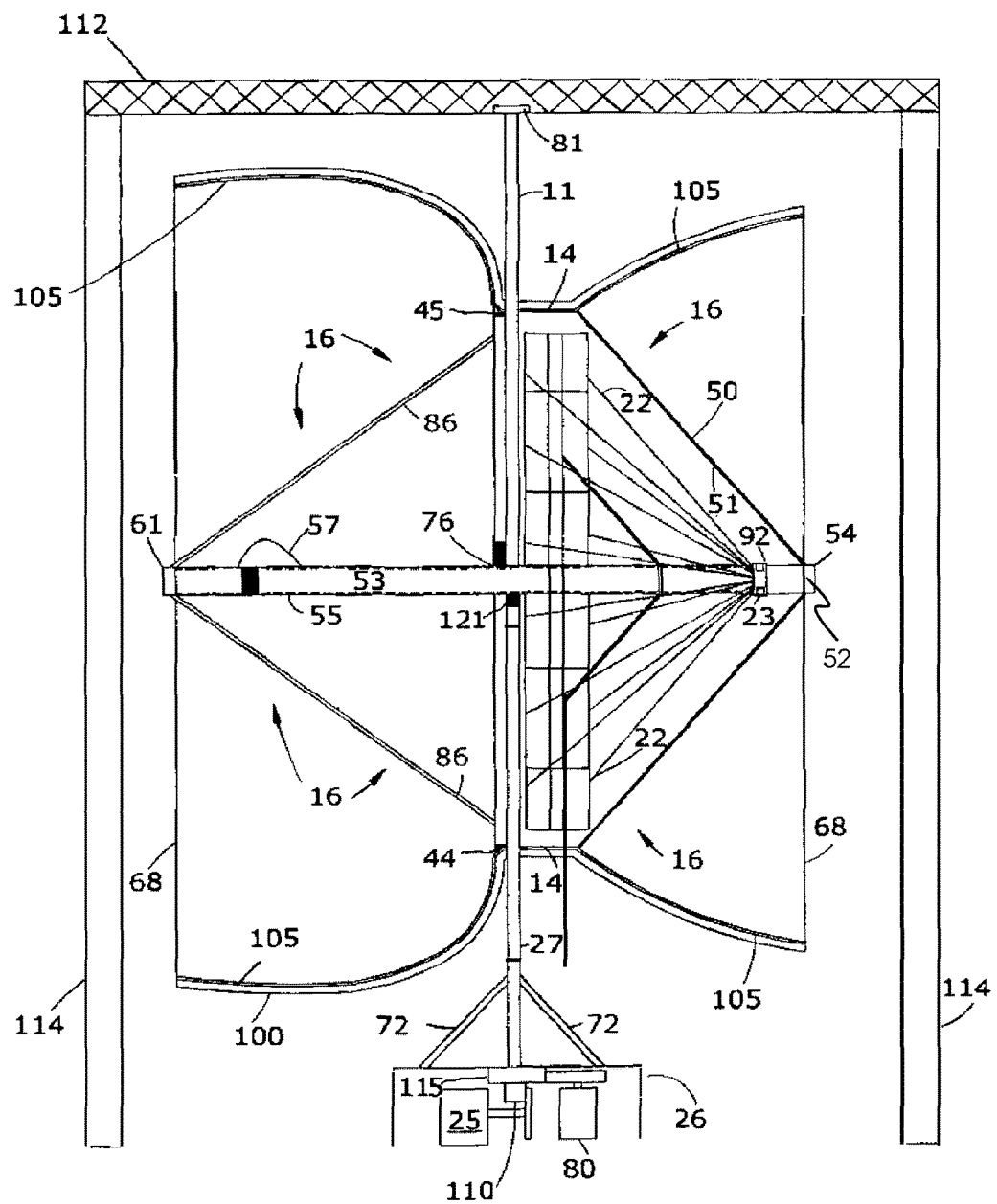
FIG. 5 is a cutaway view of the preferred embodiment of the invention.

FIG. 5 is a cutaway view of the preferred embodiment of the invention. In this embodiment, the invention will be mounted on a pedestal (11) that transmits turbine rotation energy to a generator below the windmill. The pedestal is a vertical or near vertical shaft secured on its top with the bearings (81) and on its bottom with the pedestal base (26). This construction also allows the pedestal to be turned to face the wind by the direction control motor (80), which uses the control gear (115) to turn the pedestal.

The pedestal will support a windmill (16), which is part of the present invention. The pedestal (11) will also be supported from below or above by supporting elements which in this case are the support towers (114) and the upper scaffolding (112). Some forms of the upper scaffolding include a metal frame of the type illustrated in the drawings. Some forms of the support towers also include a metal frame of the type shown in the drawings. Any sufficiently strong material will suffice for both the support towers and upper scaffolding. These two components must be designed in such a way that they can provide sufficient structural support for the bearing (81) and the pedestal (11) which is attached to it, for the pedestal to remain upright, and for the pedestal and the components attached to it to be allowed to carry out the functions discussed here in this application.

The windmill (16) of the first embodiment, is not the whole of the first embodiment of the invention. The windmill (16), of the first embodiment includes, but is not necessarily limited to, the pedestal (11), raceway (14), turbine blade area (10), main turbine shaft (53), partitioned blades (15), blade sub-sections (17), ribs (18), blade spars (19) semi-flexible foam (20), flexible epoxy coating (21), coordination cables (22), blade coordination motors (23), a rotating power transfer sleeve (27), a rotor (39), rotating brackets (40), the lower raceway holding post (44), the upper raceway holding post (45), the raceway support cables (50), the raceway support struts (51), the turbine shaft back end (52), the turbine shaft crown (54), the rotor assembly sleeve (55), the counterweight (57), the blade tips (58), the blade connection cable (59), the turbine shaft back end (61), the intersection node (76), the direction control motor (80), and the blade spar struts (86).

The following components are mounted directly on the pedestal (11), which allows the whole structure of the invention to be made as robust as needed. These components are the main turbine shaft (53), and lower raceway holding post (44) and upper raceway holding post (45). These support the raceway (14). There may also be a support shaft perpendicular to the main turbine shaft (53), where the support shaft supports a set of brackets which support the raceway (14). Raceway support struts (51) are mounted from the main turbine shaft (53) to the raceway (14).

The lower section of the pedestal (11) from the main turbine shaft (53) down is covered by a rotating power transfer sleeve (27) which is connected to the primary generators (25) through a gear at the rotating power transfer sleeve's bottom. The top of the rotating power transfer sleeve is attached to a 90 degree gear (121) and the other end of the 90 degree gear is attached to the rotor assembly sleeve (55). The main turbine shaft (53) supports the rotor assembly sleeve (55), and is connected on both ends to the raceway (14) with cables.

The rotating power transfer sleeve (27) is connected to the pedestal by bearings. This configuration allows the rotating power transfer sleeve (27) to transmit power from the rotor assembly sleeve to the primary generators (25). The following items can be mounted on the rotor assembly sleeve (55): The blade spars (19), the blade spar support struts (51), the blade coordination motors (23) and the coordination power generators (92). The coordination power generators (92) for the motors connect to a gear which is mounted around the main turbine shaft (53). As the rotor assembly sleeve (55) is turned by the wind, the coordination power generators (92) are turned by the stationary gear on the main turbine shaft (53) generating the power necessary to adjust the shape of the partitioned blades (15) so each blade sub-section (17) has the optimum angle of attack. Blade coordination motor power can, alternatively, be provided by an external source, such as the primary generators.

The primary generators (25) are at the base of the pedestal (pedestal base) (26). The pedestal base (26) also contains one or more direction control motors (80) that help the windmill (16) to turn so that it can catch the largest amount of wind energy. Essentially, the direction control motors (80) will help the windmill (16) to rotate to face the direction where it can catch the largest amount of wind energy. The invention is designed to ensure that this is possible. The prior art contains several examples of motors that can fulfill the purpose of the direction control motors (80). At the bottom of the pedestal (11) is a lower bearing (110) that helps the pedestal (11) and windmill (16) to turn if necessary.

The material for the rotating power transfer sleeve and rotor assembly sleeve (55) may be steel or ceramic or thick aluminum. Other sufficiently strong materials may also suffice.

The embodiment shown in FIG. 5 also includes a computer, which controls the direction control motors (80), and which is capable of sensing wind direction, and also capable of receiving input from an anemometer, a device for measuring the speed of wind. An anemometer should be included with the embodiment for maximum effectiveness. Computers which are capable of sensing wind direction, and anemometers, are known in the prior art. Furthermore, this embodiment includes a processor which controls the blade coordination motors (23). This processor will be electronically connected to the computer controlling the direction control motors (80) in a way that allows the computer and the processor to exchange information. The connection may be through exchange of data via wireless internet, or through another method. The prior art contains examples of motors that will serve the role of the blade coordination motors well.

The computer gauges the direction of the wind, and constantly uses the direction control motor (80) to adjust the direction that the pedestal (11) is facing. The computer also monitors the output of the anemometer. The computer calculates the angles of attack for each of the blade sub-sections (17) and waits to be queried by the processor which controls the blade coordination motors (23). The computer also calculates the proper generator loading for the wind speed, which it has sensed, and the computer configures the primary generators (25) to produce electricity optimally at that wind speed. When the antenna connected to the rotor assembly sleeve (55) is straight up, the pedestal (11) will be facing the correct direction for the invention to catch the maximum available amount of wind energy. The processor controlling the blade coordination motors (23) and cylinders will then poll the computer, which transmits to the processor the optimum angle of attack for the individual blade sections (17). The processor will then cause the blade coordination motors (23) and cylinders to adjust the coordination cables (22) until each of the blade sub-sections (17) is at the correct angle for the measured wind speed.

Figure 6:
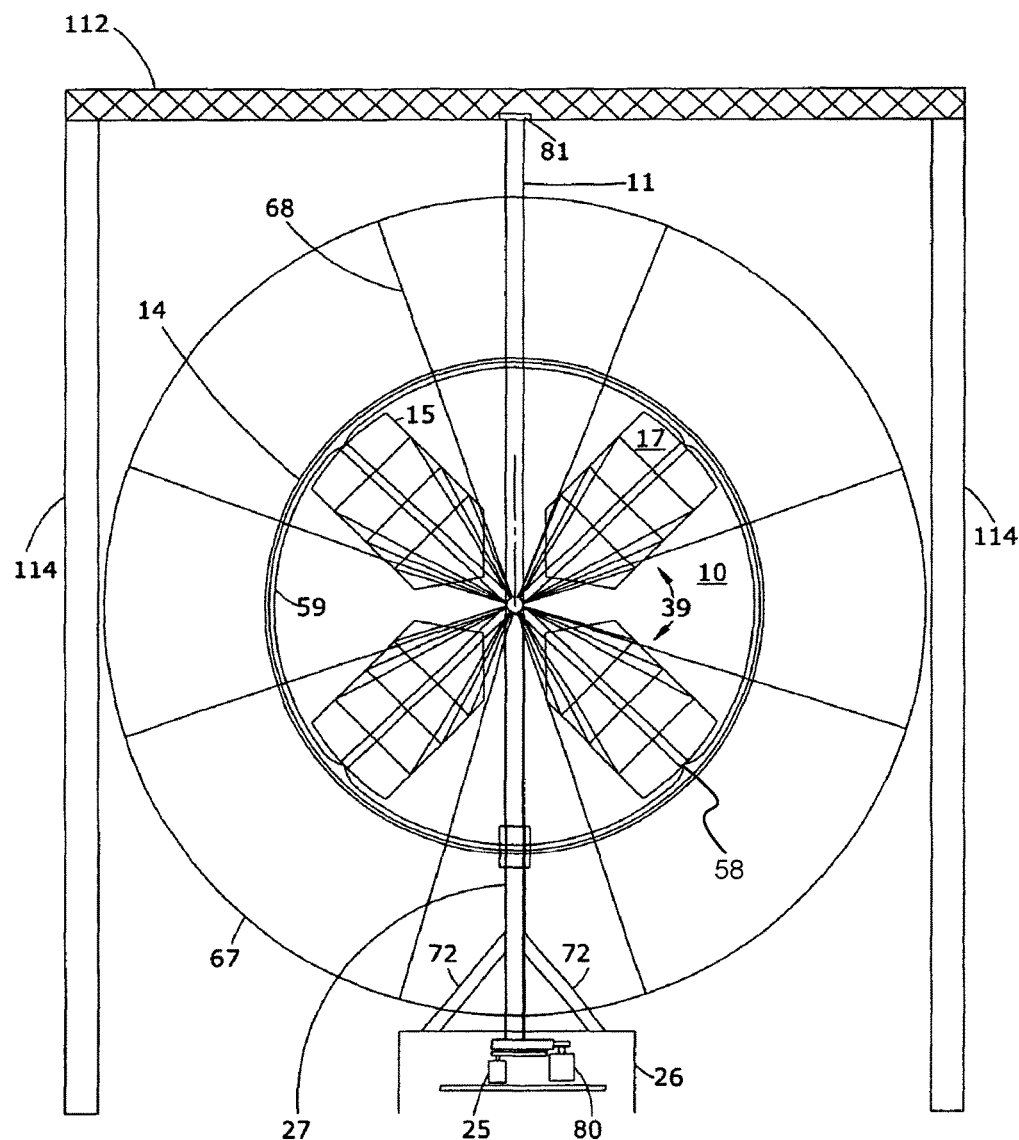
FIG. 6 is a rear view of similar embodiment of the invention.

FIG. 6 is a rear view of similar embodiment of the invention. The blade connection cable (59) surrounds the blade tips (58) and connects to each of them. This makes the embodiment more robust, and more able to withstand high winds and other pressures.

The windmill (16) will contain the partitioned blades (15), each of which has blade sub-sections (17), and a rotor (39), which comprises the partitioned blades (15). The partitioned blades (15) of the rotor (39) of the present invention will be inside a "turbine blade area" (10). The "turbine blade area" (10) is the hollow area in the center of the rotor (39) that contains the partitioned blades (15) as they turn. The raceway (14) encircles the rotor (39) of which the partitioned blades (15) are part. The raceway (14) surrounds, but is not limited to, the turbine blade area (10).

The coordination cables (22) could be made from steel. A 1-inch steel cable is capable of holding 5,000 pounds of weight, and therefore a larger steel cable would be capable of holding more weight.

Also shown in this embodiment are a shroud (67). With one of its shroud unfurling struts labelled. The purpose of the shroud (67) is to funnel wind through the raceway (14). This increases the velocity of the wind and increases the energy of the wind moving through the raceway (14) through an effect similar to the Venturi effect. Therefore, the energy of the wind hitting the partitioned blades (15) will be greater, and they will transfer more energy to the turbine shaft (53).

The shroud can be made of any of several sturdy types of cloth, which are presently on the market. The shroud can also be made of other lightweight materials. Furthermore, the shroud can be made of a ceramic material sprayed onto a cloth. Such compositions are already on the market.

Much of the air will pass through the raceway (14) but some of the air will be forced around the shroud. The shroud's (67) size and shape will determine the force it takes to force the air around the shroud (67). This force will determine the pressure in front of the blade cylinder. As the air passes around the back of the shroud (67) the air stream will be bent into the center of the shroud much like the air is bent over the back of a wing, causing a low pressure on the backside of the blades. This differential pressure is similar to the Venturi effect. The speed of the wind through the blades will be dependent on the size and shape of the shroud (67). If the shroud is large enough, and has an optimal shape, it could double the wind speed through the rotor (39), which would mean four times as much wind energy would hit the partitioned blades (15), which would be an incredible improvement over windmills of the present design.

Figure 7:
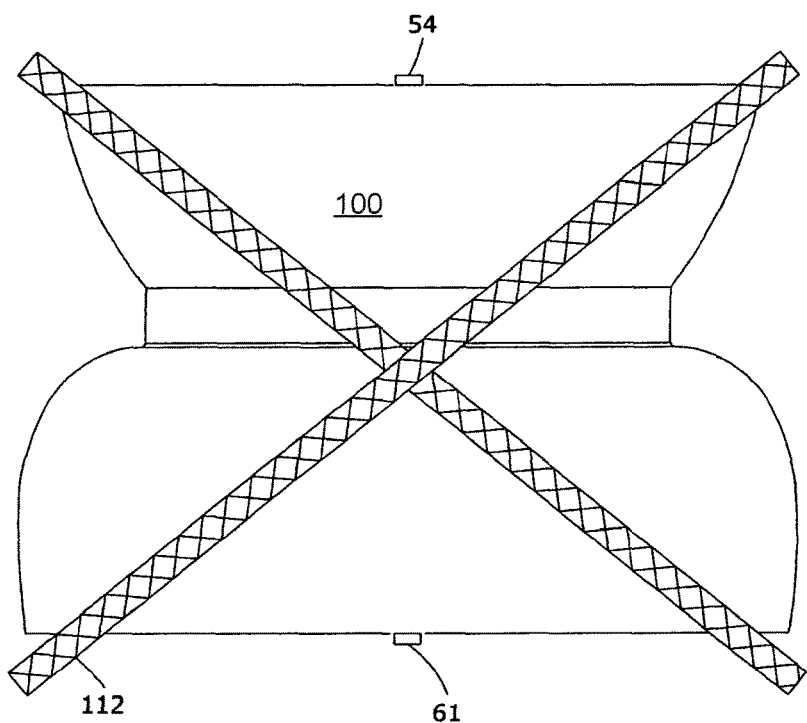
FIG. 7 shows the preferred embodiment of the invention from the top.

FIG. 7 shows the preferred embodiment of the invention from the top. The nozzle-shaped shroud (100) can be seen, and the upper scaffolding (112) is visible above it. The support towers are directly below the ends of the upper scaffolding and therefore not visible in this drawing. The turbine shaft back end (61) and turbine shaft crown (54) are both visible, but most of the other components of the invention are hidden by the nozzle-shaped shroud (100). The turbine shaft crown (54) faces the wind, so that the blade coordination cables pull against the wind.

Figure 8:
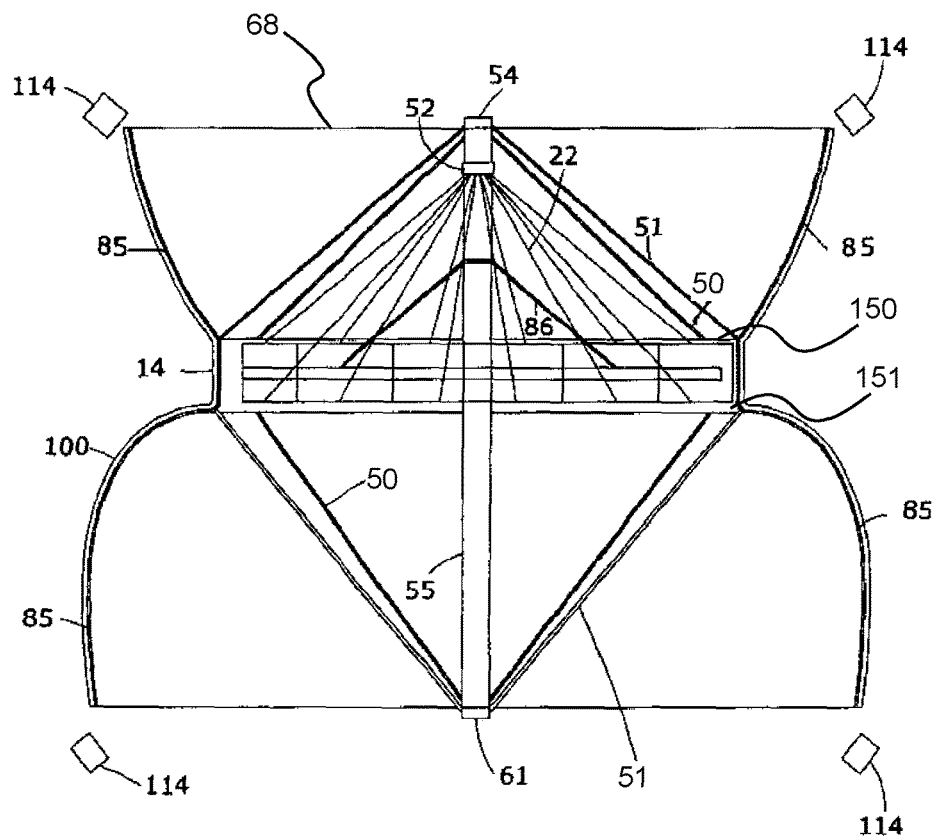
FIG. 8 shows a cutaway view of the preferred embodiment of the invention from the top.

FIG. 8 shows a cutaway view of the preferred embodiment of the invention from the top. The nozzle-shaped shroud (100) can be seen, and the nozzle-shaped shroud struts (105) can also be seen keeping the shroud in its correct position. They project out of the raceway (14). The raceway, being circular, necessarily has a measurable diameter for each of its front and rear openings. For purposes of the application, the diameter of the raceway front opening is also referred to as the first raceway diameter (150) and the diameter of the raceway rear opening is also referred to as the second raceway diameter (151). The support towers (114) and their location can be seen. The upper scaffolding is not shown in this drawing. The turbine shaft is shown, beginning with the turbine shaft back end (61). Blade spar struts (86) project out of the turbine shaft back end (61) and each reach a point on one of the blade spars (19) between the turbine shaft and the blade spar tip.

The coordination cables (22) can be seen projecting out of the turbine shaft back end (52) and reaching the ribs (18) of each of the blades.

Figure 9:
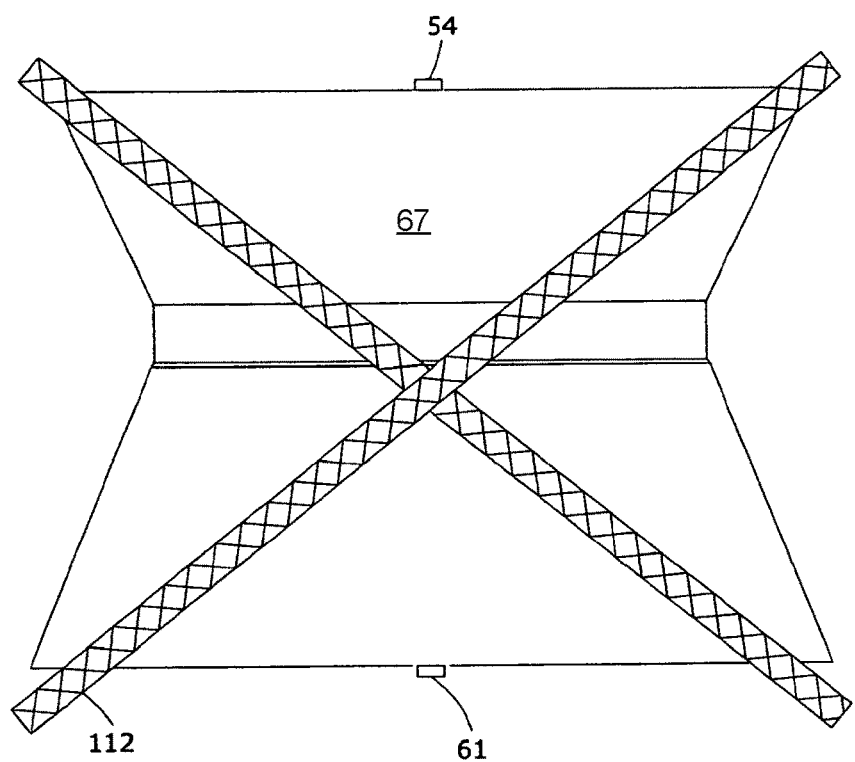
FIG. 9 shows the preferred embodiment of the invention from above.

FIG. 9 shows the preferred embodiment of the invention from above. The shroud (67) is in an hourglass shape, and its edges projects both upwards and downwards with a 45 degree angle from the raceway (14). This helps to direct wind through the invention, and to increase the velocity of this wind. The upper scaffolding (112) is visible above the shroud. The support towers are directly below the ends of the upper scaffolding and therefore not visible in this drawing. The shroud (67) covers most of the components of the invention, but the turbine shaft back end (61) and turbine shaft crown (54) can be seen.

Water and Pump Energy Storage with the Invention

An embodiment of the invention includes a connection between the primary generators (25) and a pump. The primary generators (25) provide electrical power to the pump which pumps water into a reservoir. When the amount of electrical power generated by the invention falls below a certain level, water is allowed to flow out of the reservoir. A small hydroelectric device is powered by the flowing water and produces electricity. This helps to ameliorate the effects on the power grid of inconsistency in the amount of electrical power produced by the invention. The embodiment can potentially "store" excess electrical energy, which it produces, by powering the pump which pumps water into the reservoir, where the water produces electricity when the water is allowed to flow out of the reservoir. In this was, as much as 50% of the excess electrical energy produced by the embodiment can be stored and used later. In theory, a large number of electricity-generating machines of the type described here could be connected to the same pump, which would be connected to the same reservoir, which in turn would be connected to the same hydroelectric device.

Positive displacement pumps can be used in this embodiment of the invention. They are designed to pump fluid under high pressure with extremely high efficiency, over 95%. The positive displacement pump can be converted to a generator when there is no wind. A positive displacement generator can be used to convert high pressure from the reservoir to mechanical power, to run an electric generator. Both the positive displacement pump and positive displacement generator can have an efficiency of over 95%, so the net loss of power related to this storage system should be low. The major problem with this system is finding two reservoirs of sufficient size, close enough together, and with a difference of at least 2000 ft. in elevation between them. This would be required to store power, using this embodiment of the invention, in an optimal manner, though this embodiment of the invention could also be used to store power if the difference in elevation between two reservoirs is less than 2000 ft.

Other Characteristics of the Invention

It is estimated that the total height of the pedestal should be around 280 feet, to maximize this invention's superiority, in ability to generate electrical energy, over electricity-generating windmills of the prior art. The invention will remain structurally sound at that height. The size of the partitioned blades will also be maximized, which should maximize the total amount of electrical energy generated by the invention. However, larger or smaller variations are possible, and should also provide substantial benefits in the amount of electricity generated in comparison to equally tall electricity-generating windmills of the prior art. For example, a variation of the invention with a 30-foot pedestal should produce much more electrical energy than a 30-foot-tall electricity-generating windmill of the prior art.

The diameter of the shroud at its edges could be as much as two times the diameter of the raceway. The whole blade assembly could be as much as 150 meters above the ground, depending on where the maximum wind velocity in the area is located. If the device is located on a hill or rise, the maximum wind velocity would probably be near the ground. The length of the partitioned blades could be as long as one hundred and seventy feet each.

Embodiments which utilize a shroud, nozzle-shaped shroud, or rigid shroud may include a hole for the pedestal to pass through. It should be understood that this hole should be as small as possible, so as not to allow much wind to escape through the hole. The only thing passing through the hole should be the pedestal, if possible.

This invention would generate DC electricity, which would be converted to "60 hz" AC electricity. This would enable the invention to generate power at low wind speeds, without the need for the blades to turn at a specific speed in order to directly generate "60 hz" AC electricity, sometimes known as "60" AC electricity. The invention does not need to run the blades at "60 cycle sync speed", which has the advantage of allowing the blades to run at variable speeds. This will maximize power out over a large range of wind speeds. This design will also produce power at slow wind speeds, in the 4 or 5 miles per hour range. The blade tips may move at speeds higher than 400 miles per hour, when the device operates at higher wind speeds.

The design of the present invention, with a large number of cables supporting each of the rotors, also means that the invention can have more rotors than previous windmills which generate electricity. This is because the cables allow more rotors to be supported by the invention.

Another advantage of the present invention is that each windmill can support at least 4 blades per rotor, and that these blades each have a much greater area than the blades of electricity-generating windmills of the conventional design. While the blades of the conventional rotors (3) of a windmill of the prior art might cover 9 degrees, the four larger blades of the rotors of the windmills of the present invention can embrace at least 120 degrees, and therefore be able to capture more wind energy. In combination, the features discussed above mean that the windmill of the present invention can capture much more of the wind energy flowing through a given area than conventional windmills can.

A machine built in the form of the eighth embodiment of the present invention can produce between ten and twenty times as much electricity, from the same amount of wind energy, as a conventional windmill.

The fact that the turbine of the present invention is supported from above makes this invention easy for the support cables to support other components of the invention and move, and also easier for the windmill to move to catch the wind. Wind machines of the present invention can be deployed side to side, and in multiple numbers and utilize same support structures, including hanging frame ends.

The proposed system is also much more simple to install than previous inventions in this field. Previous windmills which generate electricity have generally required complicated, expensive, installation.

Because the instant invention can generate electrical power from wind, at a much greater range of wind speeds than electricity-generating windmills of the prior art, the machine of the present invention can also be installed in a much greater range of locations than windmills of the prior art. Most of the components of the invention can be composed of aluminum or stainless steel, or lightweight metallic alloys. The functions of the turbine, primary generators, blade coordination motors, rotor assembly sleeve, rotating power transfer sleeve, pump, bearing, and hydroelectric device, and reservoir, can be fulfilled by examples of these components which are presently available on the market and known in the art.

It is important to note that the weight of the different components of the invention must be balanced properly, in order to make sure that the different components of the invention receive appropriate amounts of structural support and are counterbalanced properly as contemplated by the invention. There are several computer programs presently on the market that can calculate the amount of force exerted by the weight of the different components of the invention, and whether or not the different components of the invention are counterbalanced as intended.

Many of the components of the invention, such as the blade spar struts, coordination cables, and the raceway support cables are long and thin because they need to be thin. Otherwise, they would block the wind energy passing through the invention. It is also important that the components of the external support arrays, the turbine shaft, and the lower pedestal support poles should also be as lightweight as possible, and should be thin if possible, because this helps to reduce the weight of the invention.

Computers which presently exist can be used to monitor conditions and control the direction control motor (80) so that it turns the windmill in the direction where the windmill will capture the maximum available amount of wind energy. Computers which presently exist can also be used to monitor conditions and control the blade coordination motors so that they move the coordination cables, to move the blade sub-sections into a position where the blade sub-sections capture the largest possible amount of wind energy. Thus, it is expected that an embodiment of the invention will include a computer or computers capable
(a) of calculating an optimal orientation for the windmill with respect to an oncoming wind;
(b) controlling the direction control motor;
(c) managing primary generator torque and speed;
(d) controlling each primary generator and managing generator back torque;
(e) converting variable frequency power provided by the primary generators to 60 Hz AC electricity synchronized to grid power from an electrical power grid;
(f) controlling reactive power measured by the primary generators;
(g) controlling an output from each primary generator;
(h) controlling the output of all primary generators together; and
(i) sensing wind direction when connected to an anemometer, and using information about the wind direction to calculate the optimal for each of blade sub-sections of each of the partitioned blades.

Figure 10:
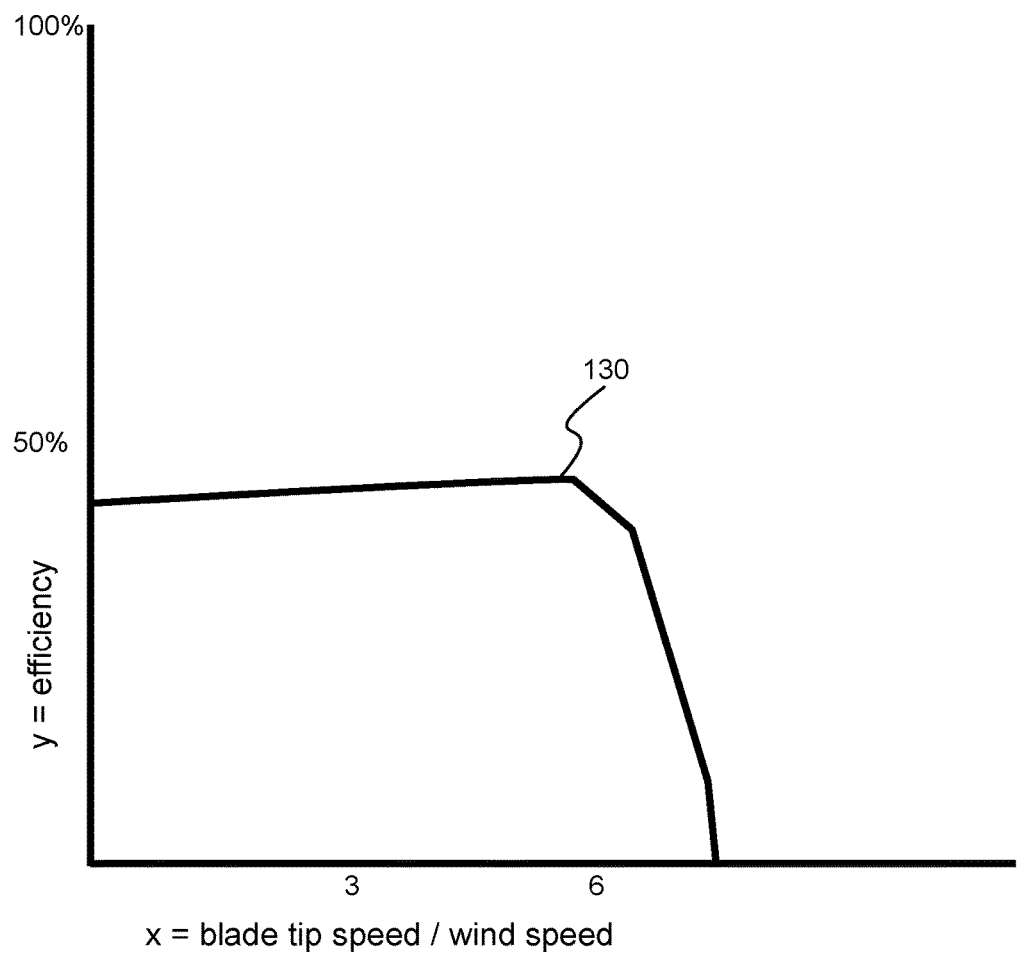
FIG. 10 is a graph illustrating the use of another embodiment of the invention.

FIG. 10 is a graph illustrating the use of another embodiment of the invention. The x axis of the graph indicates, broadly, the efficiency of a rotating windmill blade. This efficiency is typically between 30 and 60 percent based on design. The y axis of the graph indicates the ratio of the blade tip speed to wind speed (blade tip speed divided by wind speed). This shows that efficiency can rapidly drop off when the blade tip speed is over 6 times the wind speed, so it is ideal to operate at a point (130) just before that "shoulder".

This is one of the factors that can determine the best windmill blade angle. Thus, one method of controlling the blade tip speed is, as described above, altering the blade angle along the length of the turbine blades. However, in another embodiment of the invention, the blade tip speed is controlled by the loading on the main turbine. That is, if the blade tip speed to wind speed ratio of the x axis begins to stray past the efficiency shoulder, more load can be applied to the main turbine, via loading additional generators to the turbine and/or pedestal. Conversely, the x coordinate on the graph can be increased if needed by reducing the generator load on the turbine.

Figure 11:
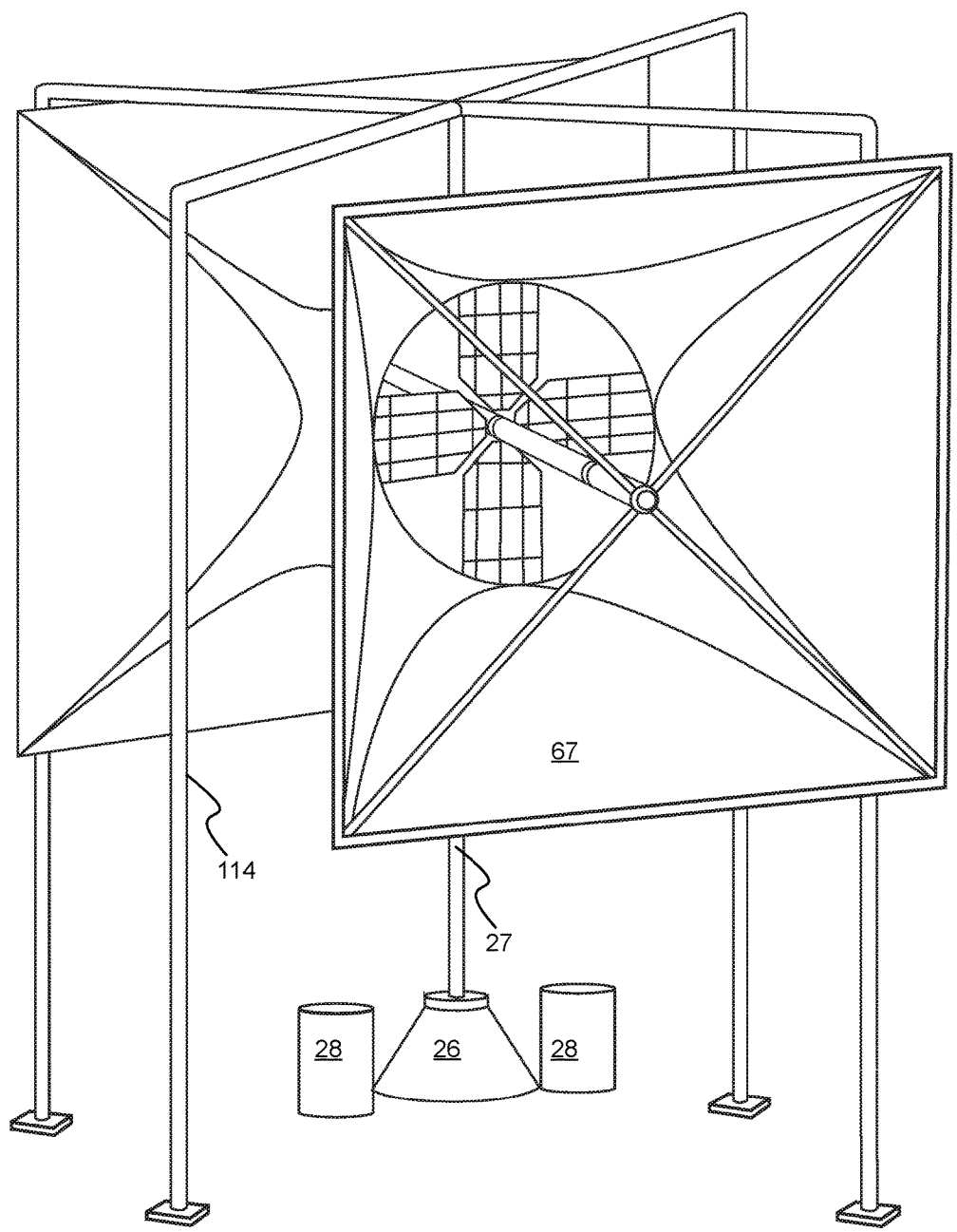
FIG. 11 is a simplified view of the invention according to FIG. 10.

FIG. 11 is a simplified view of the invention according to FIG. 10. Shroud 67, supports 114 and rotating power transfer sleeve 27 are indicated. Also indicated are multiple generators 28 which can be used to adjust the generator load on the turbine.

Figure 12:
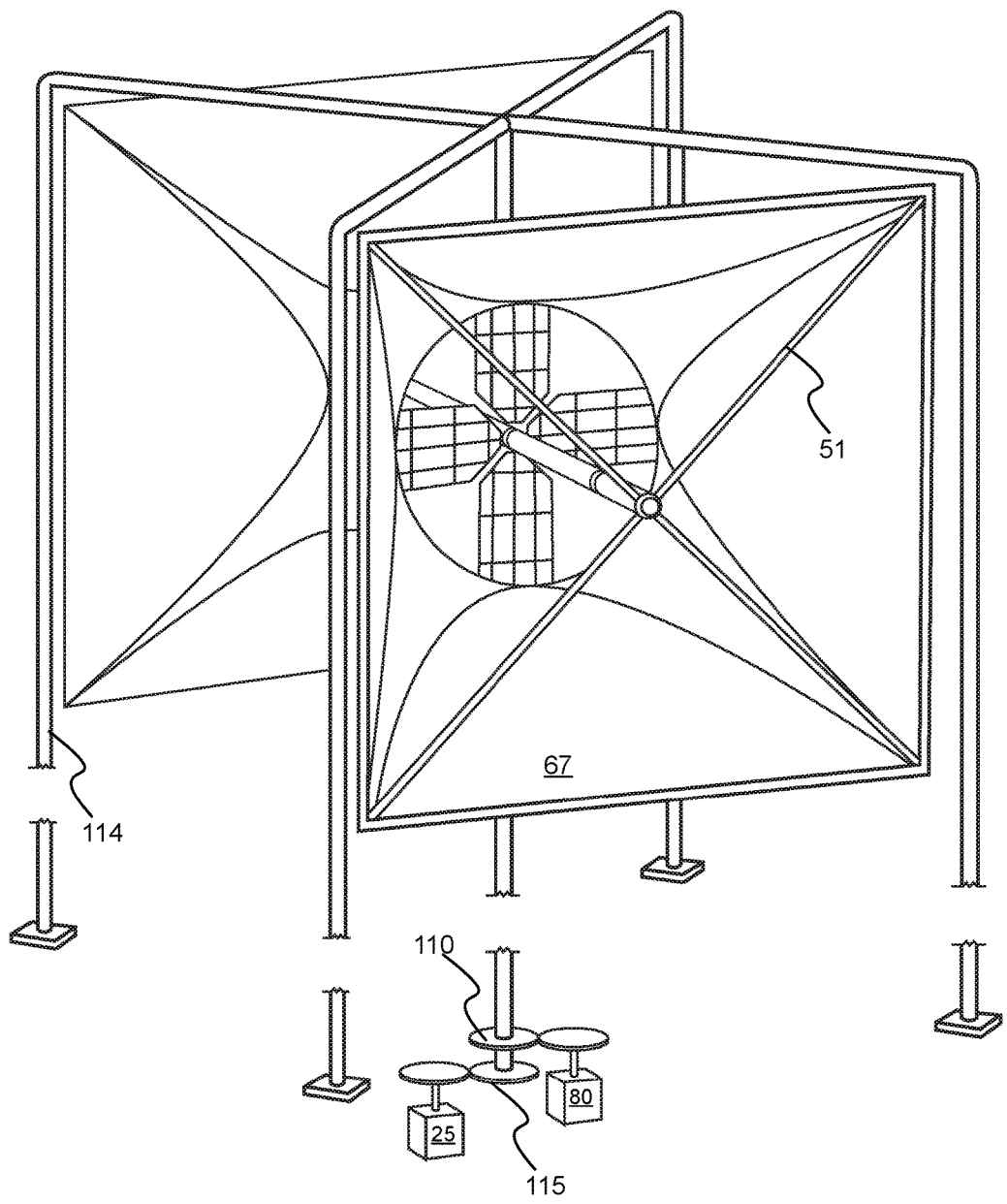
FIG. 12 is a simplified view of the preferred embodiment of the invention.

FIG. 12 is a simplified view of the preferred embodiment of the invention. Shroud 67, supports 114 and raceway support strut 51 are indicated. Also indicated are primary generator 25, direction control motor 80, lower bearing 110 and control gear 115.

Although the present invention has been described in connection with certain specific embodiments for instructional purposes, the present invention is not limited thereto. Accordingly, various modifications, adaptations, and combinations of various features of the described embodiments can be practiced without departing from the scope of the invention.

What is claimed is:
1. A wind turbine energy generation device, comprising:
a windmill, said windmill comprising:
   a horizontal main turbine shaft; said main turbine shaft comprising
      a turbine shaft middle portion surrounded by a horizontal raceway,
      a turbine shaft rear portion comprising a turbine shaft back end, and
      a turbine shaft forward portion comprising a windward-facing turbine shaft front end, said turbine shaft forward portion extending forward of said raceway and said turbine shaft front end being a distal tip of said turbine shaft forward portion;
   said raceway comprising a ring circumscribing a central interior space, said raceway ring having an outer surface and an interior surface, said central interior space being a raceway turbine blade area,
   said raceway turbine blade area having a windward-facing front opening and a rearward-facing opening,
   said raceway turbine blade area windward-facing front opening being circular and being characterised as having a first raceway diameter and said raceway turbine blade area rearward-facing opening being circular and being characterised as having a second raceway diameter;
   said windmill further comprising a rotor; said rotor comprising three or more windmill blades arranged in a circular fashion, each windmill blade thus having two adjacent blades;
      each said windmill blade comprising a blade root end adjacent said main turbine shaft and each windmill blade comprising a blade tip being an outer end of the windmill blade distal from said main turbine shaft;
   said rotor further comprising a blade tip connector, said blade tip connector being a body coupled to the blade tip of each windmill blade and thereby connecting the blade tip of each windmill blade to its two adjacent windmill blades, said blade tip connector being selected from the group
      consisting of:
      a solid ring;
      a ring of cable or chain; or else,
      a plurality of sections of cable, ties, struts, chain, or combinations of cables, ties, struts or chains;

said wind turbine energy generation device further comprising:
  a horizontal wind-channeling body having a windward-facing forward opening and a rearward-facing opening,
  said wind-channeling body rearward-facing opening being connected with the windward-facing front opening of the raceway turbine blade area,
  said wind-channeling body having a funnel-shape, said funnel-shape having either a constant slope or a changing slope;
  said wind-channeling body being either a nozzle or a shroud;
  said wind-channeling body being made of a material selected from the group consisting of metal, plastic, stiffened cloth, rigid fiber or combinations thereof;
  said wind-channeling body windward-facing opening facing the same direction as the turbine shaft forward portion and said wind-channeling body rearward-facing opening facing the same direction as the turbine shaft rear portion;
said wind turbine energy generation device further comprising:
  a plurality of raceway support bodies connecting the raceway to the turbine shaft forward portion,
  said plurality of raceway support bodies comprising at least one of:
  a raceway support strut, and
  a raceway support cable,
  said plurality of raceway support bodies providing structural support to said raceway and said main turbine shaft;
said wind turbine energy generation device further comprising:
  a pedestal, said pedestal being a vertical or near-vertical shaft;
  a pedestal base;
  one or more primary generators located in or below said pedestal base, said one or more primary generators being capable of generating electricity;
  said pedestal intersecting with the main turbine shaft such that rotation of the main turbine shaft causes transfer of rotational energy to said generators via said pedestal;
  said windmill being elevated above said pedestal base by said pedestal;
said windmill further comprising blade spar struts each beginning at said turbine shaft front end and each extending to a strut-connection point on one windmill blade, each said strut-connection point being between each respective windmill blade tip and blade root,
said blade spar struts providing structural support to said windmill blades;
each said windmill blade being a partitioned blade comprising:
  a blade spar which is a structural blade spar defining a central axis connecting each windmill blade root end to its respective windmill blade tip;
  one or more blade ribs each affixed in place along said blade spar which protrude outward perpendicularly from said blade spar;
  one or more blade sub-sections, each blade sub-section having multiple edges;
  each blade sub-section having a first edge which is connected to the blade spar, a second edge which is connected to a blade rib, and a third edge opposite the first edge which is unattached;
  at least one of said blade ribs of each windmill blade being rotatable about its respective blade spar to a greater, lesser or equal degree of rotation compared to any other of said blade ribs of its respective windmill blade, and
  at least one blade sub-section of its respective windmill blade attached to said rotatable blade rib also being rotatable about its respective blade spar to a greater, lesser or equal degree of rotation compared to any other blade sub-sections of the same blade,
  so as to alter the angle of said at least one blade sub-section with respect to the raceway turbine blade area windward-facing front opening;
  said wind turbine energy generation device, further comprising:
  a blade coordination motor situated at the turbine shaft forward portion, said blade coordination motor having a cable shortening function and a cable lengthening function, and
  a blade coordination cable having a forward end and a rearward end, said blade coordination cable forward end being connected to said blade coordination motor such that the blade coordination cable is shortenable by the cable shortening function and lengthenable by the cable lengthening function;
  said blade coordination cable rearward end being attached to a windmill blade rib such that said windmill blade rib is rotatable forward via said blade coordination motor cable shortening function and such that said windmill blade rib is rotatable rearward via said blade coordination motor cable lengthening function.

2. The wind turbine energy generation device of claim 1, said main turbine shaft further comprising a rotor assembly sleeve;
  said pedestal further comprising:
    an intersection node situated at the intersection of the pedestal with the main turbine shaft; and,
    a rotating power transfer sleeve which surrounds a portion of said pedestal between said pedestal base and said intersection node;
    said rotating power transfer sleeve being connected to said rotor assembly sleeve and being capable of transmitting mechanical energy to said rotating power transfer sleeve from said rotor assembly sleeve.

3. The wind turbine energy generation device of claim 1, said raceway ring interior surface comprising an interior circumferential groove, and
  wherein said windmill blade tips extend into said interior circumferential groove.

4. The wind turbine energy generation device of claim 3, said windmill further comprising a plurality of raceway rollers, the plurality of raceway rollers numbering at least one per windmill blade tip.

5. The wind turbine energy generation device of claim 1, said windmill further comprising a counterweight situated at the turbine shaft rear portion.

6. The wind turbine energy generation device of claim 1, further comprising a computer that is capable of:
  controlling elements of the wind turbine energy generation device to convert variable frequency power provided by one or more primary generators to mains frequency synchronized to grid power from an electrical power grid; and, wherein the computer is also capable of at least one of the following:
(a) managing primary generator torque and speed;
(b) controlling each primary generator and managing generator back torque;
(c) controlling reactive power measured by the one or more primary generators;
(d) controlling an output from each primary generator;
(e) controlling the output of all primary generators together.

7. The wind turbine energy generation device of claim 1, said main turbine shaft further comprising a rotor assembly sleeve;
    said pedestal further comprising:
        an intersection node situated at the intersection of the pedestal with the main turbine shaft; and,
        a rotating power transfer sleeve which surrounds a portion of said pedestal between said pedestal base and said intersection node;
        said rotating power transfer sleeve being connected to said rotor assembly sleeve and being capable of transmitting mechanical energy to said rotating power transfer sleeve from said rotor assembly sleeve;
        said raceway ring interior surface comprising an interior circumferential groove, and
        wherein said windmill blade tips extend into said interior circumferential groove.

8. The wind turbine energy generation device of claim 1, said main turbine shaft further comprising a rotor assembly sleeve;
    said pedestal further comprising:
        an intersection node situated at the intersection of the pedestal with the main turbine shaft; and,
        a rotating power transfer sleeve which surrounds a portion of said pedestal between said pedestal base and said intersection node;
        said rotating power transfer sleeve being connected to said rotor assembly sleeve and being capable of transmitting mechanical energy to said rotating power transfer sleeve from said rotor assembly sleeve;
        said raceway ring interior surface comprising an interior circumferential groove, and
        wherein said windmill blade tips extend into said interior circumferential groove;
        said windmill further comprising a plurality of raceway rollers, the plurality of raceway rollers numbering at least one per windmill blade tip.

9. The wind turbine energy generation device of claim 1, said main turbine shaft further comprising a rotor assembly sleeve;
    said pedestal further comprising:
        an intersection node situated at the intersection of the pedestal with the main turbine shaft; and,
        a rotating power transfer sleeve which surrounds a portion of said pedestal between said pedestal base and said intersection node;
        said rotating power transfer sleeve being connected to said rotor assembly sleeve and being capable of transmitting mechanical energy to said rotating power transfer sleeve from said rotor assembly sleeve;
        said raceway ring interior surface comprising an interior circumferential groove, and
        wherein said windmill blade tips extend into said interior circumferential groove;
        said windmill further comprising a plurality of raceway rollers, the plurality of raceway rollers numbering at least one per windmill blade tip;
    the wind turbine energy generation device further comprising a computer that is capable of:
    converting variable frequency power provided by one or more primary generators to mains frequency synchronized to grid power from an electrical power grid; and,
    sensing wind direction when connected to an anemometer, and using information about the wind direction to calculate the optimal angle for each of blade sub-sections of each of the partitioned blades; and,
    calculating an optimal orientation for the windmill with respect to an oncoming wind and controlling said direction control motor to alter the orientation of said pedestal with respect to said oncoming wind such that the windmill is moved into the calculated optimal orientation for the windmill; and,
    wherein the computer is also capable of at least one of the following:
(a) managing primary generator torque and speed;
(b) controlling each primary generator and managing generator back torque;
(c) controlling reactive power measured by the one or more primary generators;
(d) controlling an output from each primary generator;
(e) controlling the output of all primary generators together.

10. The wind turbine energy generation device of claim 1, said main turbine shaft further comprising a rotor assembly sleeve;
    said pedestal further comprising:
        an intersection node situated at the intersection of the pedestal with the main turbine shaft; and,
        a rotating power transfer sleeve which surrounds a portion of said pedestal between said pedestal base and said intersection node;
        said rotating power transfer sleeve being connected to said rotor assembly sleeve and being capable of transmitting mechanical energy to said rotating power transfer sleeve from said rotor assembly sleeve;
        said raceway ring interior surface comprising an interior circumferential groove, and
        wherein said windmill blade tips extend into said interior circumferential groove;
        said windmill further comprising a plurality of raceway rollers, the plurality of raceway rollers numbering at least one per windmill blade tip;
        said windmill further comprising a counterweight situated at the turbine shaft rear portion.

11. A wind turbine energy generation device, comprising:
    one or more primary generators, said one or more primary generators being capable of generating electricity;
    a windmill, said windmill comprising:
        a main turbine shaft; said main turbine shaft comprising
        a turbine shaft middle portion surrounded by a raceway,
        a turbine shaft rear portion comprising a turbine shaft back end, and
        a turbine shaft forward portion comprising a windward-facing turbine shaft front end, said turbine shaft forward portion extending forward of said raceway and said turbine shaft front end being a distal tip of said turbine shaft forward portion;
        said raceway comprising a ring circumscribing a central interior space, said raceway ring having an outer surface and an interior surface, said central interior space being a raceway turbine blade area;

said raceway turbine blade area having a windward-facing front opening and a rearward-facing opening, said raceway turbine blade area windward-facing front opening being circular and being characterised as having a first raceway diameter and said raceway turbine blade area rearward-facing opening being circular and being characterised as having a second raceway diameter;

the wind turbine energy generation device further comprising a wind-channeling body having a windward-facing forward opening and a rearward-facing opening being circular, said wind-channeling body rearward-facing opening being connected with the windward-facing front opening of the raceway turbine blade area, said wind-channeling body having a funnel-shape, said funnel-shape having either a constant slope or a changing slope;

said wind-channeling body being either a nozzle or a shroud;

said wind-channeling body being made of a material selected from the group consisting of metal, plastic, stiffened cloth, rigid fiber or combinations thereof;

said wind-channeling body windward-facing opening facing the same direction as the turbine shaft forward portion and said wind-channeling body rearward-facing opening facing the same direction as the turbine shaft rearward portion;

the wind turbine energy generation device further comprising a plurality of raceway support bodies connecting the raceway to the turbine shaft forward portion, said plurality of raceway support bodies comprising at least one of:

a raceway support strut, and a raceway support cable;

said plurality of raceway support bodies providing structural support to said raceway and said main turbine shaft;

said windmill further comprising a rotor;

said rotor comprising three or more windmill blades arranged in a circular fashion each windmill blade thus having two adjacent blades;

each said windmill blade comprising a blade root end adjacent said main turbine shaft and each windmill blade also comprising a blade tip being an outer end of the windmill blade distal from said main turbine shaft;

each said windmill blade being a partitioned blade comprising:

a blade spar which is a structural blade spar defining a central axis connecting each windmill blade root end to its respective windmill blade tip;

one or more blade ribs each affixed in place along said blade spar which protrude outward perpendicularly from said blade spar;

one or more blade sub-sections, each blade sub-section having multiple edges;

each blade sub-section having a first edge which is connected to the blade spar, a second edge which is connected to a blade rib, and a third edge opposite the first edge which is unattached;

at least one of said blade ribs of each windmill blade being rotatable about its respective blade spar to a greater, lesser or equal degree of rotation compared to any other of said blade ribs of its respective windmill blade, and at least one blade sub-section of its respective windmill blade attached to said rotatable blade rib also being rotatable about its respective blade spar to a greater, lesser or equal degree of rotation compared to any other blade sub-sections of the same blade, so as to alter the angle of said at least one blade sub-section with respect to the raceway turbine blade area windward-facing front opening.

12. A wind turbine energy generation device, comprising:

one or more primary generators, said one or more primary generators being capable of generating electricity;

a windmill, said windmill comprising:

a horizontal main turbine shaft; said main turbine shaft comprising a turbine shaft middle portion surrounded by a horizontal raceway, a turbine shaft rear portion comprising a turbine shaft back end, and a turbine shaft forward portion comprising a windward-facing turbine shaft front end, said turbine shaft forward portion extending forward of said raceway and said turbine shaft front end being a distal tip of said turbine shaft forward portion;

said raceway comprising a ring circumscribing a central interior space, said raceway ring having an outer surface and an interior surface, said central interior space being a raceway turbine blade area;

said raceway turbine blade area having a windward-facing front opening and a rearward-facing opening, said raceway turbine blade area windward-facing front opening being circular and being characterised as having a first raceway diameter and said raceway turbine blade area rearward-facing opening being circular and being characterised as having a second raceway diameter;

the wind turbine energy generation device further comprising a horizontal wind-channeling body having a windward-facing forward opening and a rearward-facing opening being, said wind-channeling body rearward-facing opening being connected with the windward-facing front opening of the raceway turbine blade area;

said wind-channeling body having a funnel-shape, said funnel-shape having either a constant slope or a changing slope;

said wind-channeling body being either a nozzle or a shroud;

said wind-channeling body being made of a material selected from the group consisting of metal, plastic, stiffened cloth, rigid fiber or combinations thereof;

said wind-channeling body windward-facing opening facing the same direction as the turbine shaft forward portion and said wind-channeling body rearward-facing opening facing the same direction as the turbine shaft rearward portion;

the wind turbine energy generation device further comprising a plurality of raceway support bodies connecting the raceway to the turbine shaft forward portion, said plurality of raceway support bodies comprising at least one of:
a raceway support strut, and
a raceway support cable;
   said plurality of raceway support bodies providing structural support to said raceway and said main turbine shaft;
said windmill further comprising a rotor;
   said rotor comprising three or more windmill blades arranged in a circular fashion
   each windmill blade thus having two adjacent blades;
      each said windmill blade comprising a blade root end adjacent said main turbine shaft and each windmill blade also comprising a blade tip being an outer end of the windmill blade distal from said main turbine shaft;
   each said windmill blade being a partitioned blade comprising:
      a blade spar which is a structural blade spar defining a central axis connecting each windmill blade root end to its respective windmill blade tip;
      one or more blade ribs each affixed in place along said blade spar which protrude outward perpendicularly from said blade spar;
      one or more blade sub-sections, each blade sub-section having multiple edges;
      each blade sub-section having a first edge which is connected to the blade spar, a second edge which is connected to a blade rib, and a third edge opposite the first edge which is unattached;
   said wind turbine energy generation device, further comprising:
      a blade coordination motor situated at the turbine shaft forward portion, said blade coordination motor having a cable shortening function and a cable lengthening function, and
      a blade coordination cable having a forward end and a rearward end, said blade coordination cable forward end being connected to said blade coordination motor such that the blade coordination cable is shortenable by the cable shortening function and lengthenable by the cable lengthening function;
      said blade coordination cable rearward end being attached to a windmill blade rib such that said windmill blade rib is rotatable forward via said blade coordination motor cable shortening function and such that said windmill blade rib is rotatable rearward via said blade coordination motor cable lengthening function.

13. The wind turbine energy generation device of claim 12, further comprising a computer that is capable of:
   converting variable frequency power provided by one or more primary generators to mains frequency synchronized to grid power from an electrical power grid; and,
   sensing wind direction when connected to an anemometer, using information about the wind direction to calculate the optimal angle for each of blade sub-sections of each of the partitioned blades, and controlling the blade coordination cables via said blade coordination motor such that each of the blade sub-sections is moved to its calculated optimal angle; and,
   wherein the computer is also capable of at least one of the following:
(a) managing primary generator torque and speed;
(b) controlling each primary generator and managing generator back torque;
(c) controlling reactive power measured by the one or more primary generators;
(d) controlling an output from each primary generator;
(e) controlling the output of all primary generators together.

14. The wind turbine energy generation device of claim 11, further comprising:
   a pedestal, said pedestal being a vertical or near-vertical shaft;
   a pedestal base, said one or more primary generators being located in or below said pedestal base,
   a direction control motor located in or below said pedestal base;
   a lower bearing located in or below said pedestal base; and,
   an upper bearing located on top of said pedestal and permitting said pedestal to rotate;
   said windmill being mounted on said pedestal,
   said pedestal having an orientation with respect to an oncoming wind, said windmill having an orientation matched to said pedestal orientation,
   said direction control motor being capable of changing the orientation of said pedestal and said windmill;
   said direction control motor thus altering the orientation of said pedestal with respect to an oncoming wind,
   said direction control motor thus also altering the orientation of said windmill with respect to an oncoming wind.

* * * * *